US011301944B2

(12) United States Patent
Darnell et al.

(10) Patent No.: US 11,301,944 B2
(45) Date of Patent: Apr. 12, 2022

(54) CONFIGURING CLASSROOM PHYSICAL RESOURCES

(71) Applicant: International Business Machines Corporation, Armonk, NY (US)

(72) Inventors: Shelby S. Darnell, Nairobi (KE); Sharathchandra U. Pankanti, Darien, CT (US); Nalini K. Ratha, White Plains, NY (US); Komminist Weldemariam, Nairobi (KE)

(73) Assignee: International Business Machines Corporation, Armonk, NY (US)

( * ) Notice: Subject to any disclaimer, the term of this patent is extended or adjusted under 35 U.S.C. 154(b) by 488 days.

(21) Appl. No.: 15/486,429

(22) Filed: Apr. 13, 2017

(65) Prior Publication Data
US 2018/0300830 A1 Oct. 18, 2018

(51) Int. Cl.
*G06Q 50/20* (2012.01)
*G06K 9/62* (2022.01)
*G06V 20/52* (2022.01)
*G06V 40/16* (2022.01)
*G06Q 10/06* (2012.01)

(52) U.S. Cl.
CPC ........... *G06Q 50/20* (2013.01); *G06K 9/6267* (2013.01); *G06Q 10/06315* (2013.01); *G06V 20/52* (2022.01); *G06V 40/172* (2022.01); *G06V 40/174* (2022.01)

(58) Field of Classification Search
CPC ......... G06K 9/00771; G06Q 10/06315; G06Q 50/20
See application file for complete search history.

(56) References Cited

U.S. PATENT DOCUMENTS

| 6,704,541 B1 | 3/2004 | Ciarallo et al. |
| 8,187,004 B1 | 5/2012 | Desensi et al. |
| 9,888,371 B1 * | 2/2018 | Jacob ..................... G08B 13/22 |

(Continued)

FOREIGN PATENT DOCUMENTS

| CN | 103543769 B | 1/2014 |
| CN | 201320598741 U | 2/2014 |

(Continued)

OTHER PUBLICATIONS

International Searching Authority, International Search Report and Written Opinion for International Application No. PCT/IB2017/058210, dated Apr. 23, 2018, pp. 1-10.

(Continued)

*Primary Examiner* — Pan G Choy
(74) *Attorney, Agent, or Firm* — Law Office of Jim Boice

(57) ABSTRACT

A computer-implemented method modifies physical classroom resources in a classroom. One or more processors identify and quantify physical classroom resources in the classroom based on sensor readings received from sensors in a classroom. The processor(s) determine physical classroom resource constraints that impede learning by students in the classroom based on the sensor readings from the sensors in the classroom. The processor(s) detect one or more of the physical classroom resource constraints in the physical classroom resources identified by the sensor readings, and then adjust the one or more physical classroom resources based on the one or more detected physical classroom resource constraints.

6 Claims, 13 Drawing Sheets

(56) References Cited

U.S. PATENT DOCUMENTS

| | | | |
|---|---|---|---|
| 2006/0137525 A1* | 6/2006 | Rae | F01N 11/00 55/523 |
| 2007/0099167 A1 | 5/2007 | Eason | |
| 2008/0215414 A1* | 9/2008 | Fehnel | G06Q 10/0631 705/7.16 |
| 2009/0000228 A1* | 1/2009 | Valoe | E04H 3/08 52/235 |
| 2009/0278935 A1 | 11/2009 | Rainier | |
| 2011/0053133 A1 | 3/2011 | Rock et al. | |
| 2011/0298722 A1* | 12/2011 | Tse | G06F 3/041 345/173 |
| 2013/0173776 A1 | 7/2013 | Kang et al. | |
| 2013/0226674 A1* | 8/2013 | Field | G06Q 50/20 705/7.38 |
| 2014/0199671 A1 | 7/2014 | Hippeli et al. | |
| 2014/0253883 A1* | 9/2014 | Akamatsu | G03B 21/2033 353/85 |
| 2014/0272896 A1 | 9/2014 | Malik et al. | |
| 2014/0335497 A1* | 11/2014 | Gal | G09B 7/00 434/323 |
| 2016/0129638 A1* | 5/2016 | Bostick | G06F 30/00 700/98 |

FOREIGN PATENT DOCUMENTS

| | | | | |
|---|---|---|---|---|
| CN | 103679592 A | | 3/2014 | |
| CN | 103699936 A | | 4/2014 | |
| CN | 203825661 U | | 9/2014 | |
| CN | 102830664 B | * | 10/2014 | Y02P 90/10 |
| CN | 204303018 U | | 4/2015 | |
| CN | 106502132 A | | 3/2017 | |
| JP | 2006127057 A | | 5/2006 | |
| WO | 2004109633 A2 | | 12/2004 | |

OTHER PUBLICATIONS

P. Mell et al., "The NIST Definition of Cloud Computing", National Institute of Standards and Technology, Information Technology Laboratory, Sep. 2011, pp. 1-7.

Shi et al., "The Smart Classroom: Merging Technologies for Seamless Tele-Education". IEEE Pervasive Computing, vol. 2, Issue 2, Jun. 11, 2003, pp. 47-55.

Mary Burns, "How to Help Teachers Use Technology in the Classroom: The 5J Approach". Elearn Magazine, vol. 2010, Issue 9, Sep. 2010, Article No. 4.

D'Mello et al., "Automatic Detection of Learner's Affect From Gross Body Language". Journal of Applied Artificial Intelligence, vol. 23, Issue 2, Feb. 2009, pp. 123-150.

Barry J. Fraser, "Using Learning Environment Assessments to Improve Classroom and School Climates". School Climate: Measuring, Improving and Sustaining Healthy Learning Environments. London, Philadelphia: Falmer Press, 1999.

Robert F. Hoffman, "The Psychology of Expertise: Cognitive Research and Empirical AI". Springer-Verlag New Yokr, Inc., New York, NY, USA, 1992.

ibm.com, "Education Technology Solutions". IBM Industries, Web. Nov. 29, 2016. <http://www-935.ibm.com/industries/education/>.

Kerr et al., "Strategies to Promote Data Use for Instructional Improvement: Actions, Outcomes, and Lessons From Three Urban Districts". American Journal of Education, vol. 112, No. 4, Aug. 2006.

Margaret Angela Kurdziolek, "Classroom Resources and Impact on Learning". Dissertation Submitted to the Faculty of the Virginia Polytechnic Institue and State University in Partial Fulfillment of the Requirements for the Degree of Doctor of Philosophy in Computer Science, Blacksburg, VA, Aug. 5, 2011.

Mashburn et al., "Measures of Classroom Quality in Pre-Kindergarten and Children's Development of Academic, Language, and Social Skills". Child Development, May/Jun. 2008, vol. 79, No. 3, pp. 732-749.

Sandholtz et al., "Teaching in High-Tech Environments: Classroom Management Revisited, First—Fourth Year Findings". Apple Computer, Inc., Apple Classrooms of Tomorrow Research, Report No. 10, pp. 1-8.

Japanese Office Action, dated Jul. 26, 2021.

Great Britain Intellectual Property Office, Examination Report of YOR920161714GB1, dated Aug. 27, 2021.

* cited by examiner

CONFIGURING CLASSROOM PHYSICAL RESOURCES

BACKGROUND

The present invention relates to the field of physical resource configuration, particularly to configuring physical resources in a classroom. Still more particularly, the present invention relates to optimizing the configuration of physical resources in a classroom.

SUMMARY

In a computer-implemented method embodiment of the present invention, one or more processors monitor inanimate classroom resources in a classroom based on sensor readings from one or more monitoring devices in the classroom. The processor(s) assess conditions of the inanimate classroom resources, and then identify inanimate classroom resources whose conditions lead to constraints that impede learning by students in the classroom. The processor(s) identify a presence of and activities by animate objects in the classroom that impede learning by the students in the classroom. The processor(s) then determine a classroom index of the classroom based on the conditions of the inanimate objects and the presence of and the activities by the animate objects in the classroom. The processor(s) determine whether the classroom index exceeds a predetermined threshold value. In response to determining that the classroom index exceeds the predetermined threshold value, the processor(s) issue instructions to modify the inanimate classroom resources whose conditions lead to constraints that impede learning by the students in the classroom.

In another computer-implemented method embodiment of the present invention, one or more processors identify and quantify physical classroom resources in the classroom based on sensor readings received from sensors in a classroom. The processor(s) determine physical classroom resource constraints that impede learning by students in the classroom based on the sensor readings from the sensors in the classroom. The processor(s) detect one or more of the physical classroom resource constraints in the physical classroom resources identified by the sensor readings, and then adjust the one or more physical classroom resources based on the one or more detected physical classroom resource constraints.

Other embodiments of the present invention include a computer system and a computer program product.

DETAILED DESCRIPTION

Figure 1:
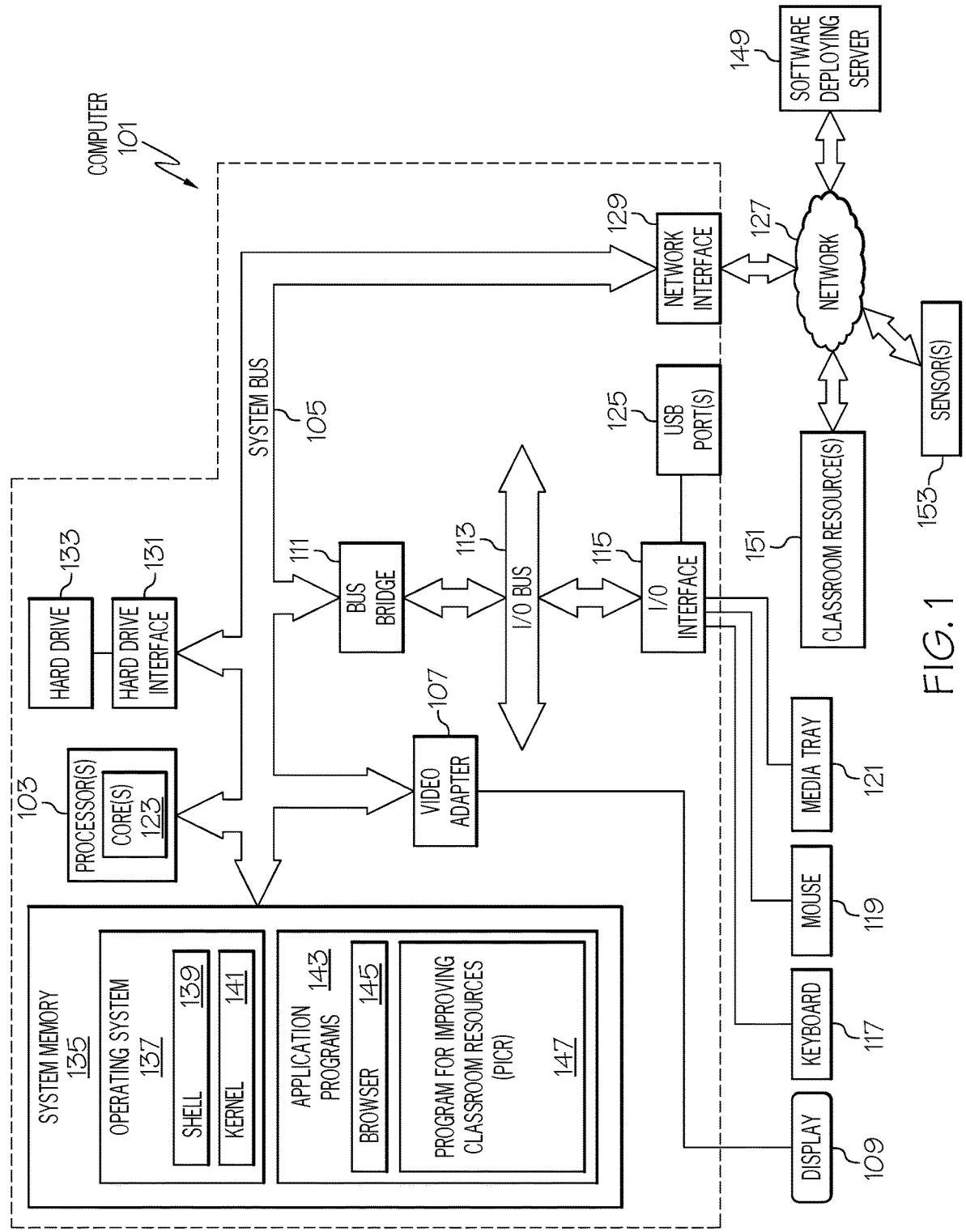
FIG. 1 depicts an exemplary system and network in accordance with one or more embodiments of the present invention.

With reference now to the figures, and in particular to FIG. 1, a block diagram of an exemplary system and network in accordance with one or more embodiments of the present invention is depicted. In some embodiments, part or all of the exemplary architecture, including both depicted hardware and software, shown as associated with and/or within computer 101 can: be downloaded from and/or implemented by software deploying server 149; and/or may use one or more classroom resource(s) 151. Some embodiments use monitoring computer 201 shown in FIG. 2.

With further reference to FIG. 1, exemplary computer 101 includes processor(s) 103, operably coupled to a system bus 105, which further operably couples various internal and external components. Processor(s) 103 may embody or use one or more processor core(s) 123. A video adapter 107, which drives/supports a display 109, is also coupled to system bus 105.

System bus 105 is coupled via a bus bridge 111 to an input/output (I/O) bus 113. An I/O interface 115 is coupled to I/O bus 113. I/O interface 115 enables communication with various I/O devices, including a keyboard 117, a mouse 119, a media tray 121 (which may include storage devices such as CD-ROM drives, multi-media interfaces, etc.), and external USB port(s) 125. While the format of the ports connected to I/O interface 115 may be any known to those skilled in the art of computer architecture, in one or more embodiments, some or all of these ports are universal serial bus (USB) ports.

As depicted, network interface 129 is also coupled to system bus 105. Network interface 129 can be a hardware network interface, such as a network interface card (NIC), etc. Computer 101 is able to communicate with a software deploying server 149 and/or classroom resource(s) 151 via network interface 129 and network 127. Network 127 may include (without limitation) one or more external networks—such as a wide area network (WAN), and/or a network of networks such as the Internet—and/or one or more internal networks such as an Ethernet or a virtual private network (VPN). In one or more embodiments, network 127 includes a wireless network, such as a Wi-Fi network, and a cellular network. An example embodiment of the present invention utilizes a network "cloud" environment, which will be discussed with reference to FIG. 12 and FIG. 13.

Referring again to FIG. 1, a hard drive interface 131 is also coupled to system bus 105. Hard drive interface 131 interfaces with a hard drive 133. In some embodiments, hard drive 133 is a non-volatile form of memory for storing and populating system memory 135 (e.g., a volatile form of memory, such as so-called random access memory (RAM)), which is also coupled to system bus 105.

In some embodiments, system memory may be considered a lowest level of volatile memory in computer 101. System memory 135 may include additional, higher levels of volatile memory (not shown), including, but not limited to, cache memory, registers and buffers. Logic and/or data (not depicted) residing in system memory 135 can include or be associated with operating system (OS) 137 and application programs 143. In some embodiments, part or all of system memory 135 can be shared and/or distributed across one or more systems. For example, application programs 143 might be distributed across one or more software deploying servers 149 or other systems.

Operating system (OS) 137 includes a shell 139, for providing transparent user access to resources such as application programs 143. Generally, shell 139 is a program that provides an interpreter and an interface between the user and the OS. More specifically, shell 139 (sometimes referred to as a command processor) can execute commands entered into a command-line user interface or from a file. In other words, shell 139 can serve as a command interpreter. While shell 139 is a text-based, line-oriented user interface, the present invention will equally well support other user interface modes, such as graphical, voice, gestural, etc. As depicted, shell 139 can be considered the highest level of an OS software hierarchy. The shell can also provide a system prompt, interpret commands entered by keyboard, mouse, or other user input media, and send the interpreted command(s) to the appropriate (e.g., lower) levels of the operating system (e.g., a kernel 141) for processing.

As depicted, OS 137 also includes kernel 141, which includes (hierarchically) lower levels of functionality for OS 137. A few (non-limiting) examples of kernel functions include: providing essential services required by other parts of OS 137 and application programs 143, including memory management, process and task management, disk management, and mouse and keyboard management.

Application programs 143 can include a renderer, shown in exemplary manner as a browser 145. Browser 145 includes program modules and instructions (not depicted) enabling a World Wide Web (WWW) client (i.e., computer 101) to send and receive network messages from network 127 (e.g., the Internet using hypertext transfer protocol (HTTP) messaging), thus enabling communication with software deploying server 149 and other systems.

In some embodiments, application programs 143 include a program for improving classroom resources (PICR) 147. In this example, PICR 147 includes program instructions (software) adapted for implementing processes and/or functions in accordance with the present invention, such as (without limitation) those described with reference to FIGS. 2-13. In some embodiments, PICR 147 is downloaded from software deploying server 149, (on-demand or "just-in-time") e.g., where the PICR 147 software is not downloaded until needed for execution. In some embodiments of the present invention, software deploying server 149 can perform all (or many) of the functions associated with the present invention (including execution of PICR 147), thus freeing computer 101 from having to use its internal computing resources.

In some embodiments of the present invention, computer 101 is able to remotely communicate with, test and/or control aspects of classroom resources(s) 151, such as computers, video monitors, projectors, telecommunication devices, Wi-Fi hotspot routers/access points, etc. One example of such control can be achieved by sending control packets over network 127 to logic (e.g., software) associated with one or more of the classroom resource(s) 151. The control packets thus adjust the classroom resource(s) 151 by repairing them (e.g., installing a software patch), turning them on, adjusting their volume or brightness (e.g., on a video monitor), etc.

In some embodiments of the present invention, computer 101 is able to remotely communicate with sensor(s) 153, which may include a video camera, a microphone, a chemical sensor, a light sensor, etc. In one or more embodiments of the present invention, these sensor(s) 153 provide sensor readings (e.g., video, audio, chemical indication, etc.) about inanimate objects (e.g., broken furniture, broken windows, etc.) and/or animate objects (e.g., teachers, students, animals, etc.) within a classroom such as classroom 200 shown in FIG. 2.

The hardware elements depicted in computer 101 are not intended to be exhaustive, but rather are representative to highlight essential components required by the present invention. For instance, computer 101 may include alternate memory storage devices such as flash memory, magnetic cassettes, digital versatile disks (DVDs), Bernoulli cartridges, etc. These and other variations are intended to be within the spirit and scope of the present invention.

One or more embodiments of the present invention present a method and system for detecting and/or analyzing a need for managing classroom artifacts (e.g., broken chairs, broken windows, doors, noise level, attendance, the behavior of students, etc.). This enables the determination of an insight based on this need, and recommending ways of improving resource allocation and classroom management based on this insight. In one or more embodiments of the present invention, a recommending agent is triggered automatically based on a recipient cohort analysis. That is, once the classroom and/or its resources and/or its occupants are determined (by a recipient cohort analysis that determines who and what is in the classroom), then the recommending agent will recommend what changes to the classroom are made based on what and what is currently in the classroom.

For school administrators, it is important to know the key metrics of the school systems they oversee. The key metrics include: the attendance patterns in the school; effectiveness of the classroom measured in terms of participation level from the students; status of the facility such as a classroom, the environment in the school and other facilities in the school. Using visual analytics as a key technology, these three metrics are measured and reported to the administration on a real-time basis.

For example, the system can determine the students in a classroom using face counting. Based on the interaction between the teacher and the students' activity in the class, a report of the effectiveness in the class is created. Furthermore, the system reports major changes/anomalies in the facility such as broken furniture or missing doors based on the visual images of the facility.

Many people share classroom environments. This multi-use situation can cause challenges at different levels (e.g., pre-school, K-12, higher education). Classrooms may be occupied when a class is scheduled to begin, tables and desks may be dirty, trash may be left behind by previous students, trash cans may be overflowing, whiteboards may be filled with writing from other classes, chairs/windows/doors may have been broken, rearranged or misplaced, equipment may be broken or malfunctioning, etc. Some classes also have more enrolled students than teachers can accommodate (i.e., an excessively high student:teacher ratio) or too few chairs to accommodate all of the students. Furthermore, an arrangement of chairs in a classroom may be awkward based on the style of teaching planned.

Teachers or school administrators are most successful in addressing learning issues when they have anticipated the possible issues that arise from environmental conditions or behavioral issues, and determined an intervention in advance. The present invention thus presents classroom technologies for instrumenting artifacts in a classroom, in order to complement direct observation of instruction by peers, auditors, and coaches.

Thus, one or more embodiments of the present invention utilize systems, tools, frameworks, practices, etc. to measure student-teacher, student-content, student-student, etc. engagements for behavioral analysis; understand in what context and classroom environment a student is learning; and correlate how this affects their learning outcomes, etc. This is achieved by collecting/storing multimedia data (e.g., images, video, audio) about the user, classroom and school artifacts (chairs, doors, windows, toilet, water sources, etc.). Inferring information from these thus impacts the student, classroom, and school management by assisting teachers and authorities in making intelligent decisions, reporting major issues or changes in the facility such as broken furniture, missing doors based on the visual images of the facility, etc.

Thus, the present invention provides classroom monitoring and/or management tools that encourage interactions, in context, with the users in an attempt to improve classroom environment. Furthermore, the present invention provides classroom monitoring and/or management processes that use visual analytics to continuously assess classroom artifacts and events, pass these analyzed results to a cognitive processing unit, and notify teachers and relevant authorities of issues with interactions, behavior, status of the classroom environment, etc.

As described herein, the present invention presents a method and system to make a classroom "learnable" while providing continuous measurements and constructive insights into teacher and administrative practices, using visual analytics and a cognitive dashboard as the key technology on a real-time basis. Given a set of multimedia artifacts of the classroom in real-time, the present invention analyzes and generates a cognitive dashboard for assisting classroom teachers, school administrators, and other decision makers. This is achieved by analyzing multimedia artifacts (e.g. classroom images, video, etc.) captured using low-cost devices, which are used to compute the "classroom index" of a classroom, including detected non-human inanimate and/or animate objects. This enables the system to update the cognitive dashboard in real-time and notify (e.g., using a short message service (SMS) notification) relevant users.

In one or more embodiments, the presently presented system monitors and records classroom video and audio. A computer-based cognitive agent then analyzes the classroom scene (including the state of furniture, windows, equipment, etc.) and prompts the appropriate system for corrective actions.

Thus, the present invention tracks and analyzes classroom artifacts (e.g., chairs, windows, doors, noise, attendance, student behavior, etc.) to provide needs-based automatic environment improvement recommendations. The artifacts are managed based on the requirements of the group using the system, such as providing notices of classroom equipment requiring maintenance, aiding resource allocation, etc. The automatic recommendations/notifications reduce teacher distraction and aide positive student outcomes.

Figure 2:
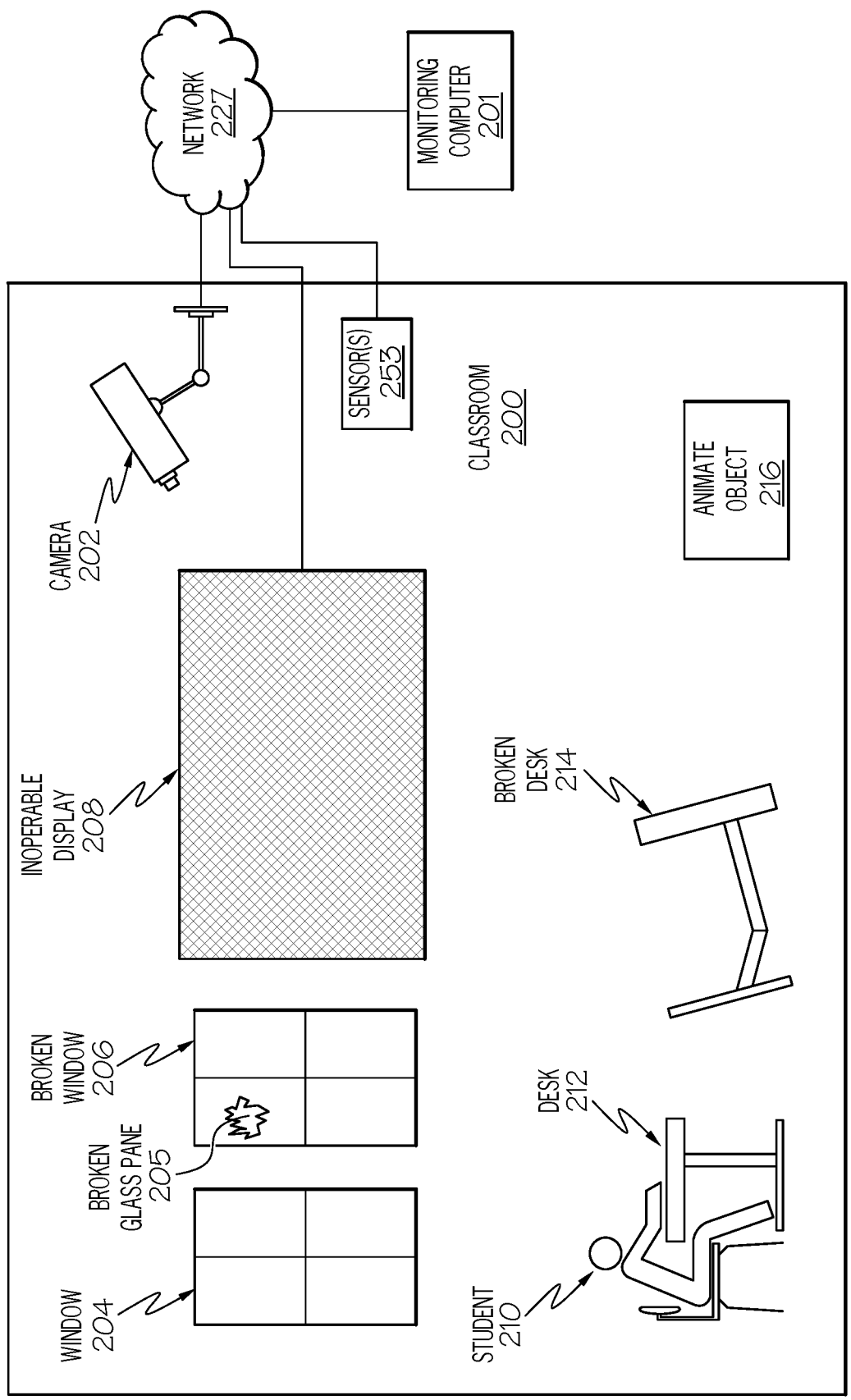
FIG. 2 illustrates an exemplary classroom being monitored in accordance with one or more embodiments of the present invention.

With reference now to FIG. 2, assume that a classroom 200 is being monitored by a camera 202, which along with sensor(s) 253 are examples of the sensor(s) 153 shown in FIG. 1. Assume further that camera 202 and other sensors 253 are being remotely monitored in real time by a monitoring computer 201 (analogous to computer 101 shown in FIG. 1) via a communication afforded by network 227 (analogous to network 127 shown in FIG. 1). For purposes of explanation, the invention will now be discussed with reference to video images sent from camera 202 to monitoring computer 201, although it is to be understood that similar analytics/operations described below can be performed by monitoring computer 201 on sensor readings received by other types of sensors found in sensor(s) 253, such as audio pickup, chemical detection, vibration sensations, etc. It is also to be understood that monitoring computer 201 utilizes a program such as PICR 147 shown in FIG. 1 to perform the operations described below.

As described herein, camera 202 and/or sensor(s) 253 monitor the state of inanimate and/or animate objects within classroom 202.

For example, camera 202 can send video images of window 204 (having no defects) and/or broken window 206 (having a broken glass pane 205) to monitoring computer 201. Furthermore, camera 202 can send video images of both desk 212 (which is in good condition) and/or broken desk 214 (which is broken apart). Furthermore, camera 202 can send video images of both an exemplary student 210 and/or another animate object 216 (e.g., a classroom teacher, an animal such as a classroom pet, a varmint such as a rat, a wild bird, etc.).

Furthermore, a display 208 (e.g., a video monitor attached to a computing device, a video player, the Internet, etc.) may be broken. This inoperable state of display 208 may be visually detected by camera 202, or it may be determined by monitoring computer 201 via network 227. That is, monitoring computer 201 can remotely monitor the status and abilities of display 208 by sending it test packets, remotely monitoring components of display 208, etc. in order to determine that display 208 is currently inoperable.

Thus, the present invention identifies the presence of broken inanimate objects (e.g., the broken window 206, the inoperable display 208, the broken desk 214) and/or unbroken inanimate objects (e.g., the window 204 and/or the desk 212) and/or animate objects (e.g., the student 210 and/or animate object 216) to adjust the state of the inanimate/animate objects (e.g., location, operability, condition of repair, etc.) in order to improve the state of one or more of the inanimate objects.

Figure 3:
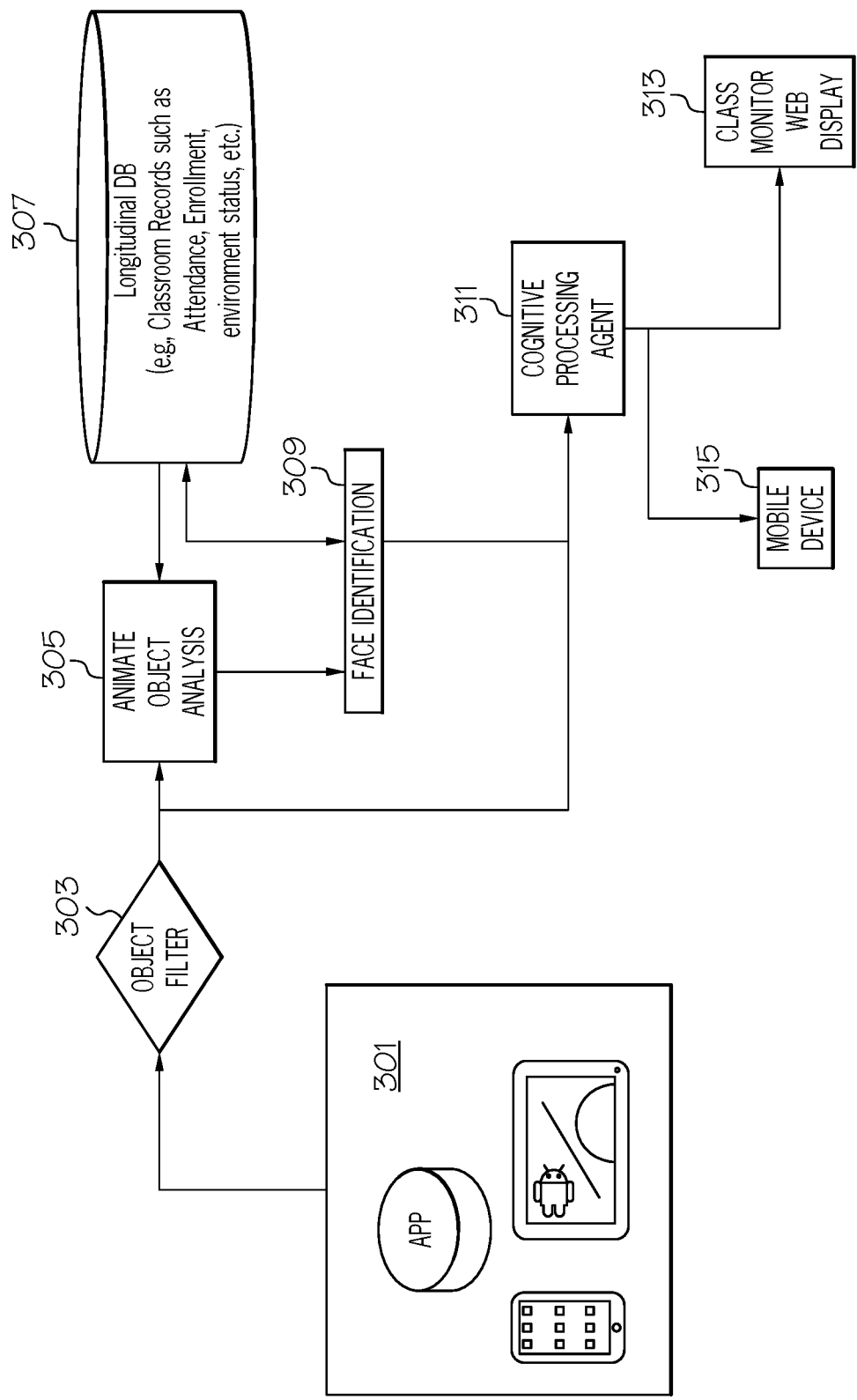
FIG. 3 depicts an exemplary person and environment analysis of a classroom in accordance with one or more embodiments of the present invention.

With reference now to FIG. 3, a person and environment analysis process performed by monitoring computer 201 according to one or more embodiments of the present invention is presented.

As shown in FIG. 3, videos 301 (e.g., from video camera 202 shown in FIG. 2) taken of classroom 200 are sent through an object filter 303, which uses image recognition to identify the inanimate and animate objects that are within the classroom in real time. If the object filter 303 identifies particular object as being an animate object, then an animate object analysis 305 determines what type of animate object it is. If it is a student based on face identification 309, then information from a longitudinal database 307 is sent to a cognitive processing agent (e.g., part of PICR 147 shown in FIG. 1), which sends an image of the student to a class monitor web display 313 (e.g., part of monitoring computer 201) and/or a mobile device 315 (e.g., a smart phone used by a principal of a school).

Figure 4:
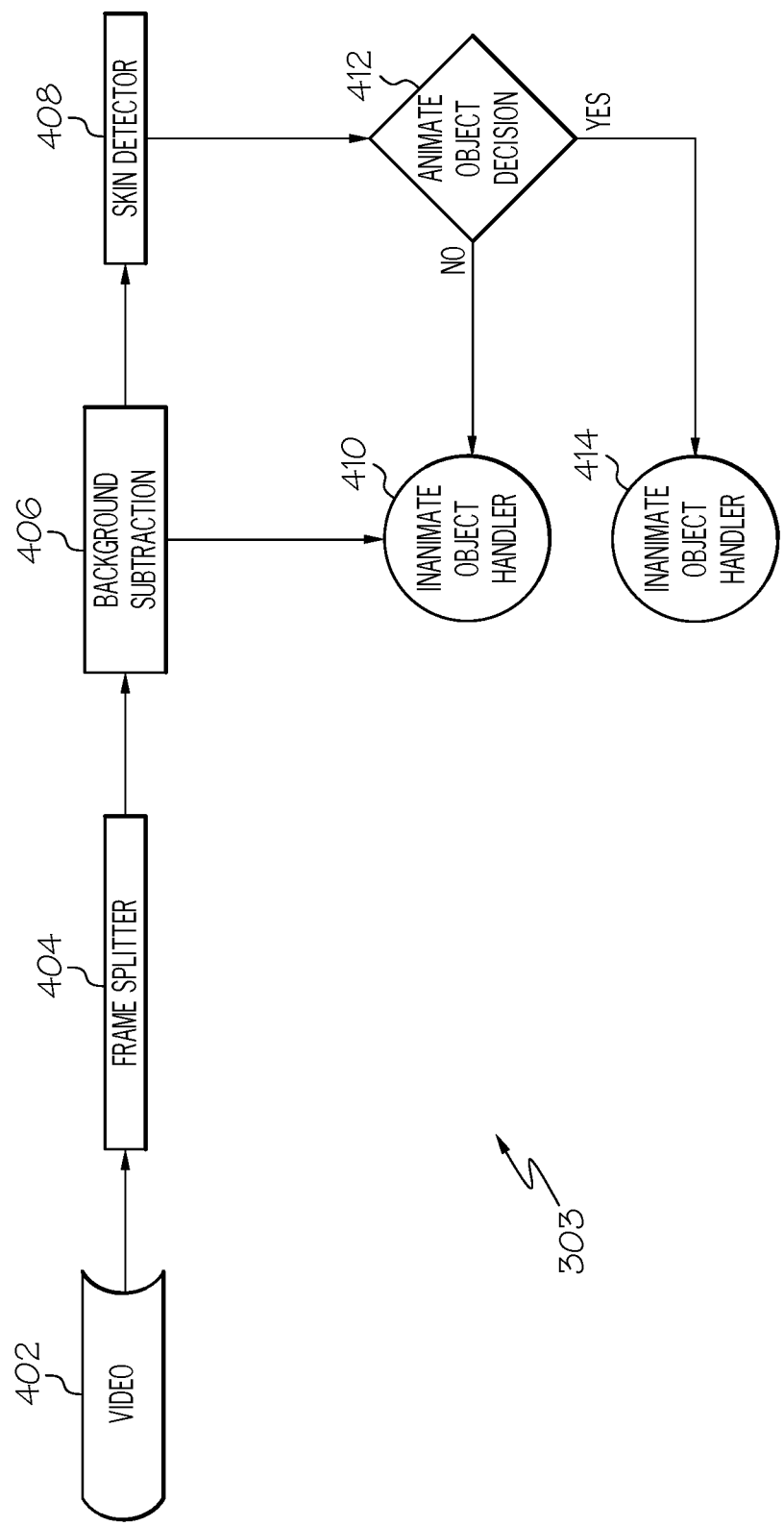
FIG. 4 illustrates an exemplary object detection module as used in accordance with one or more embodiments of the present invention.

As shown in FIG. 4, additional detail of an object detection module (e.g., object filter 303 shown in FIG. 3) is presented. A video 402 is sent to a frame splitter 404, which is able to separate out animate objects from inanimate objects in the video 402 using a variety of processes. For example, the PICR 147 may associate thermal readings from sensor(s) 253 with video images taken by camera 202 to identify animate objects (e.g., student 210 that emits heat at body temperature) from inanimate objects (e.g., broken desk 214 that is at room temperature or broken window 206, which is at a different temperature from window 204 due to the presence of the broken pane 205). Furthermore, image recognition may recognize certain background objects as those that rarely move (e.g., desk 212) or never move (e.g., window 204 or display 208), and then remove such objects from consideration using the background subtraction 406 shown in FIG. 4.

Figure 5:
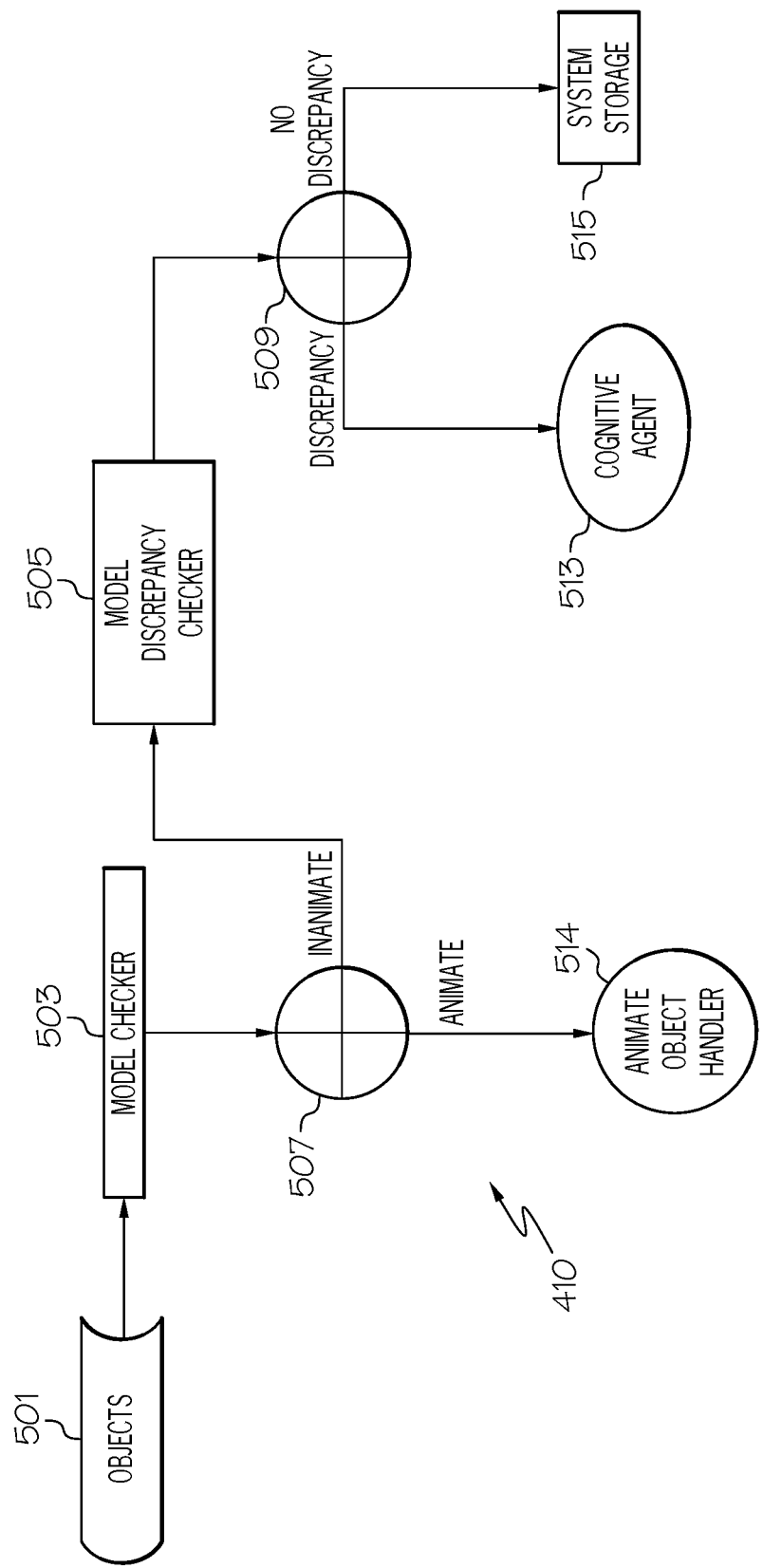
FIG. 5 depicts an exemplary inanimate object handler as used in accordance with one or more embodiments of the present invention.

Thus, background subtraction 406 causes inanimate objects detected in the video to be sent to an inanimate object handler 410, which is described in further detail in FIG. 5.

If the object filter 303 shown in FIG. 3 determines that the video image is that of an animate object, then a skin detector 408 determines whether the object (which is not part of the background) is animate or inanimate by detecting the temperature, texture, etc. of the object, which are indicative of the object being an animate object. This determination is made in query block 412 in FIG. 4. If the observed object is inanimate, then it is (like the background images) sent to the inanimate object handler 410. However, if query block 412 determines that the video image is that of an animate object, then that video image is sent to an animate object handler 414, which is described in further detail in FIG. 6.

With reference then to the detail shown in FIG. 5 of inanimate object handler 410, video images of objects 501 are sent to a model checker 503, which compares the video images to known images of animate and inanimate objects, as described in decision block 507. If the video images show the characteristics of animate objects, then they are sent to animate object handler 514 (similar to animate object handler 414 shown in FIG. 4). However, if the video images show the characteristics of inanimate objects (decision block 507), then they are sent to a model discrepancy checker 505, which compares the inanimate object images to known models of inanimate objects found in system storage 515. If the video image of a particular inanimate object matches a particular inanimate object model (i.e., according to various characteristics such as shape, color, size, etc.—"no discrepancy"), then a copy of the video image is sent to system storage 515 in a file reserved for such video files. However, if the video image does not match a known model file, then the image is sent to a cognitive agent 513, which performs further analysis of the video image (e.g., mapping to other images based on matching shapes, colors, etc.).

Figure 6:
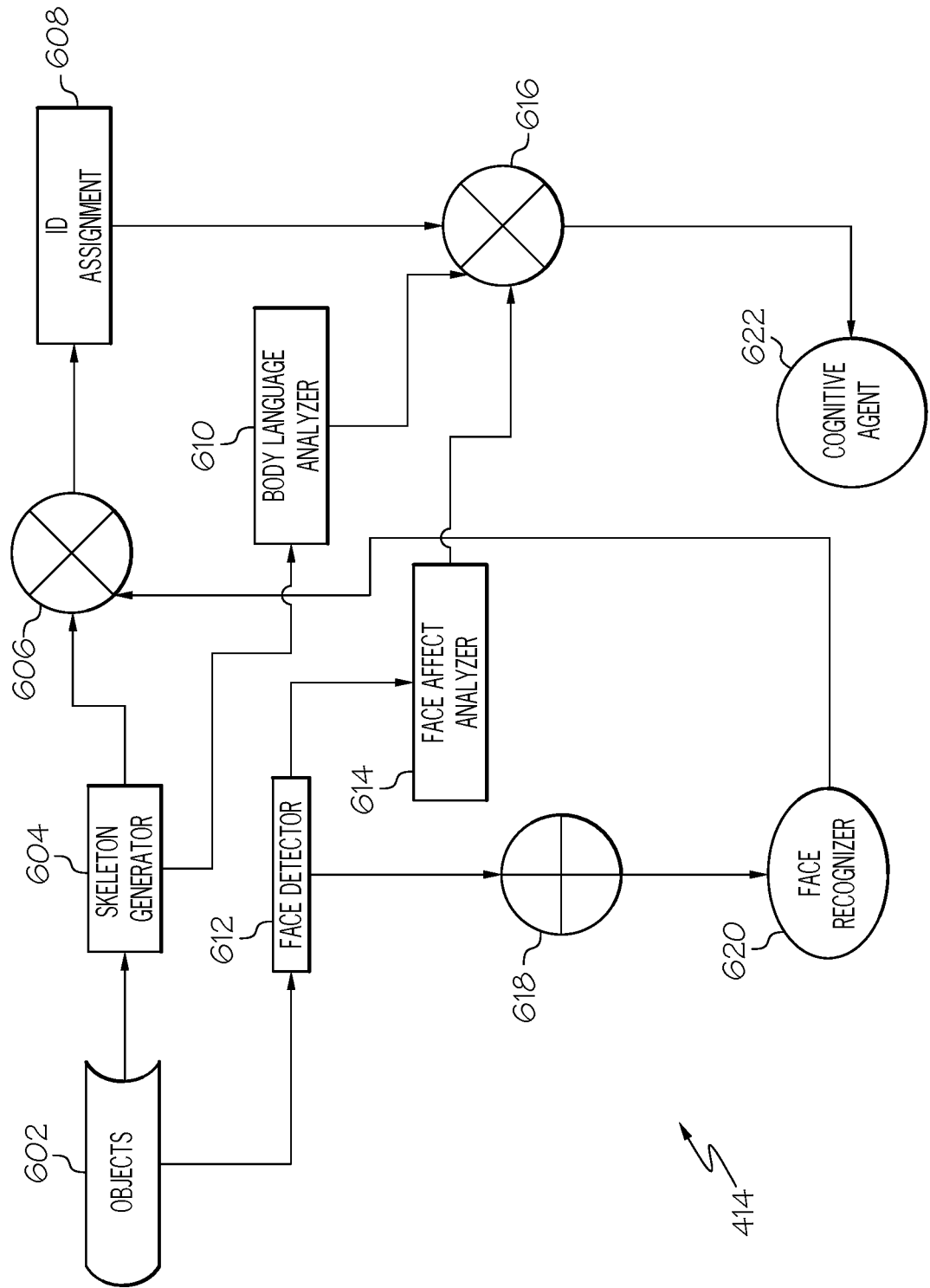
FIG. 6 illustrates an exemplary animate object handler as used in accordance with one or more embodiments of the present invention.

With reference now to the detail shown in FIG. 6 of animate object handler 414, the video images of objects 602 are sent to a skeleton generator 604, which generates an animated "stick figure" that shows the shape, movement, size, etc. of the animate object in the video. At the same time, the video images of the objects 602 are sent to a face detector 612 (assuming that the animate object detected in FIG. 4 is a human). If the face detector determines that the video image of the animate object captures the front of a person's face (decision block 618), then facial recognition software is used by a face recognizer 620 to identify which person is in the video. However, even if the image is not face-on enough to identify the person in the video, a face affect analyzer 614 is still able to determine (from images from the side, etc.) if the person is alert, happy, looking around, etc.

As shown in evaluator block 606, if the system is able to recognize the person's face (using face recognizer 620) and generate a stick figure of the person (using skeleton generator 604), then the system will have enough information to identify the person and issue that person an identification assignment 608.

As shown in body language analyzer 610, the system is also able to analyze the movement of the person in the video in order to determine if that person is restless (as indicated by frequent and/or erratic movement of the generated stick figure that corresponds to the video of the person), calm (as indicated by smooth body movements represented by the generated stick figure), etc.

Figure 7:
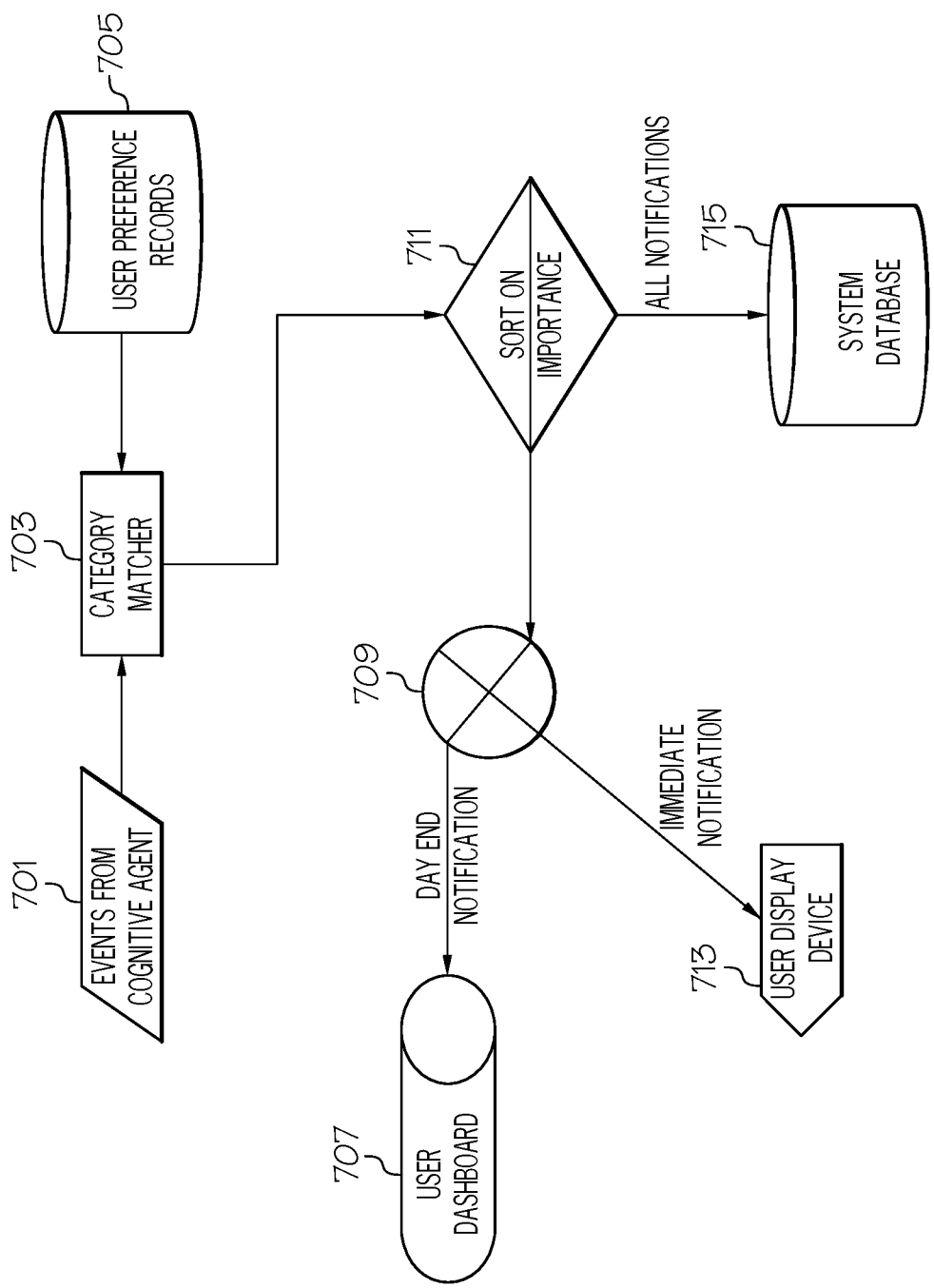
FIG. 7 depicts an exemplary notification determination module as used in accordance with one or more embodiments of the present invention.

Based on the identity of the person in the video (from identification assignment 608), the movement of the person in the video (from body language analyzer 610), and the facial expressions of the person in the video (from face affect analyzer 614) as combined by combinatorial logic 616, a cognitive agent 622 is able to determine the emotional state of the person (e.g., alert, distracted, inattentive, anxious, etc.) using the process shown in FIG. 7.

Once the cognitive agent 622 combines the identification, facial, and body movements of a person in the video (events from cognitive agent shown in block 701 in FIG. 7), a category matcher 703 matches these features to a particular student or a particular class of student (e.g., age of the student, subject matter being taught to the student, etc.). User preference records 705 are then used to sort on importance 711 whether or not and/or when a corrective action needs to be taken on inanimate objects in the classroom. An example of an entry of the user preference records 705 is that a user may prefer that a certain resource be always turned on (e.g., a video monitor). Thus, this user prefers that the video monitor is always operational. However, the same user may not really care if the video monitor is cracked, just a long as it is still functional. Thus, the user does not care if the crack is repaired.

This leads to decision block 709 determining that notifications and instructions for correcting the problematic inanimate objects can be sent to a user dashboard 707 (used by a school administrator) at the end of the day, or else an immediate notification may need to be sent to a user display device 713 (e.g., used by school maintenance personnel) immediately. Either way, all notifications are stored in a system database 715 for future use (in future cases that match the features/states shown in the current video) for a proof of action database.

Figure 8:
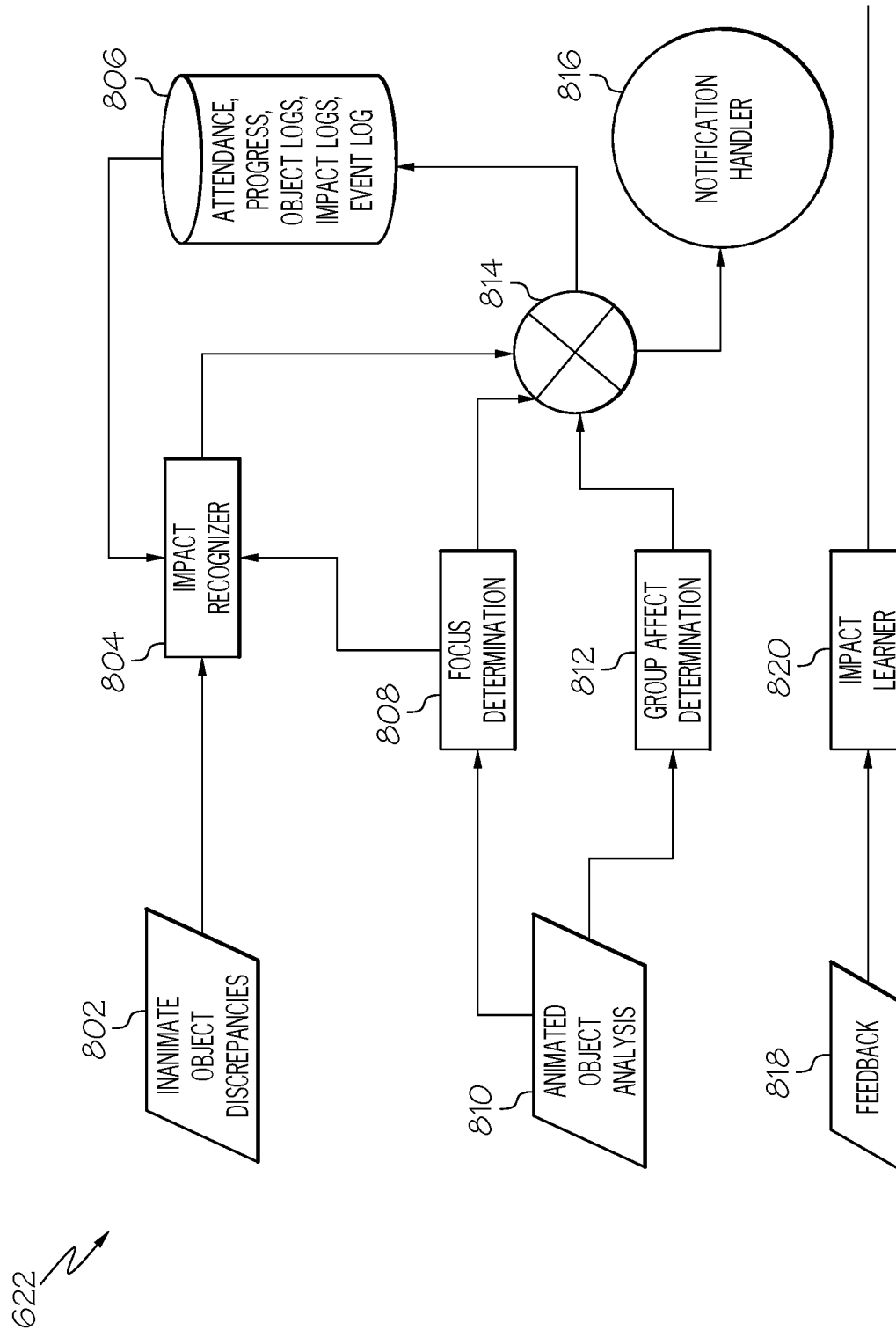
FIG. 8 illustrates an exemplary cognitive reasoning module as used in accordance with one or more embodiments of the present invention.

With reference now to FIG. 8, additional detail of the cognitive agent 622 shown in FIG. 6 is shown. Cognitive agent 622 inputs inanimate object discrepancies 802 (e.g., the broken glass pane 205 shown in FIG. 2) into an impact recognizer 804, which determines what impact such broken objects have on the students in the classroom. The determination of this impact is bolstered/confirmed by records in database 806, which describe past attendance, grades, events, etc. that have been experienced by one or more students in the classroom in response to the presence of broken objects in the classroom.

At the same time, the results of the animate object analysis described in FIG. 6, and depicted in FIG. 8 as animated object analysis 810, are used to make a focus determination 808 (how the broken objects in the classroom affect the focus of a single student) and a group affect determination 812 (how the broken objects in the classroom affect the entire body of students in the classroom).

As shown in combinatorial logic 814, the impact on the student (from impact recognizer 804) caused by a broken object in the classroom, as well as the effect on the student and the entire classroom caused by broken object (from focus determination 808 and group affect determination 812) are used to generate a notification to correct the object that is currently suffering a discrepancy (e.g., is broken). This notification is sent to a notification handler 816, which sends the notification to user dashboard 707 and/or user display device 713 shown in FIG. 7.

As shown in feedback 818 block, the teacher in the classroom may provide feedback as to what positive, negative, or neutral impact correcting the problem with the defective object has had on one or more of the students in the classroom. This feedback is fed into an impact learner 820, which learns 1) what impact correcting the problem has had, and 2) whether similar corrections should be applied in the future under similar circumstances. Exemplary types of feedback 818 and how they are generated are shown in FIG. 9.

Figure 9:
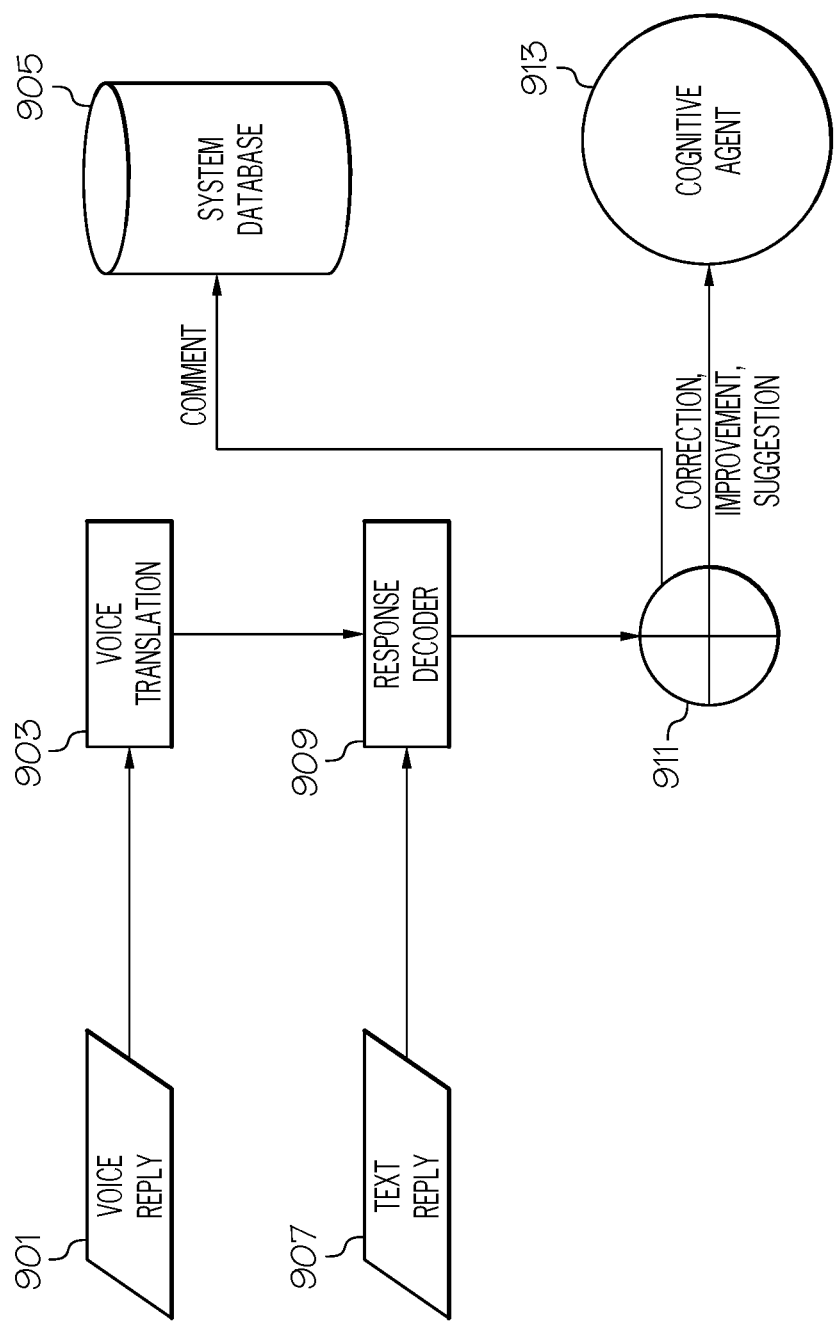
FIG. 9 depicts an exemplary feedback handler as used in accordance with one or more embodiments of the present invention.

As shown in FIG. 9, the feedback may be a voice reply 901, which goes through a device for voice translation device 903, or it may be a text reply 907, which goes directly to a response decoder 909, which interprets (using text analysis) what the replies state. As shown in block 911, all feedback replies are stored in a system database 905. If the response decoder interprets the reply as suggesting an improvement or change to the action, then this is sent to a cognitive agent 913, which makes such changes. For example, if the teacher responds with a message stating that repairing the broken glass pane 205 with a wooden board has actually led to increased discomfort in the classroom students, then the suggestion may be to replace the broken glass pane with new glass.

Figure 10:
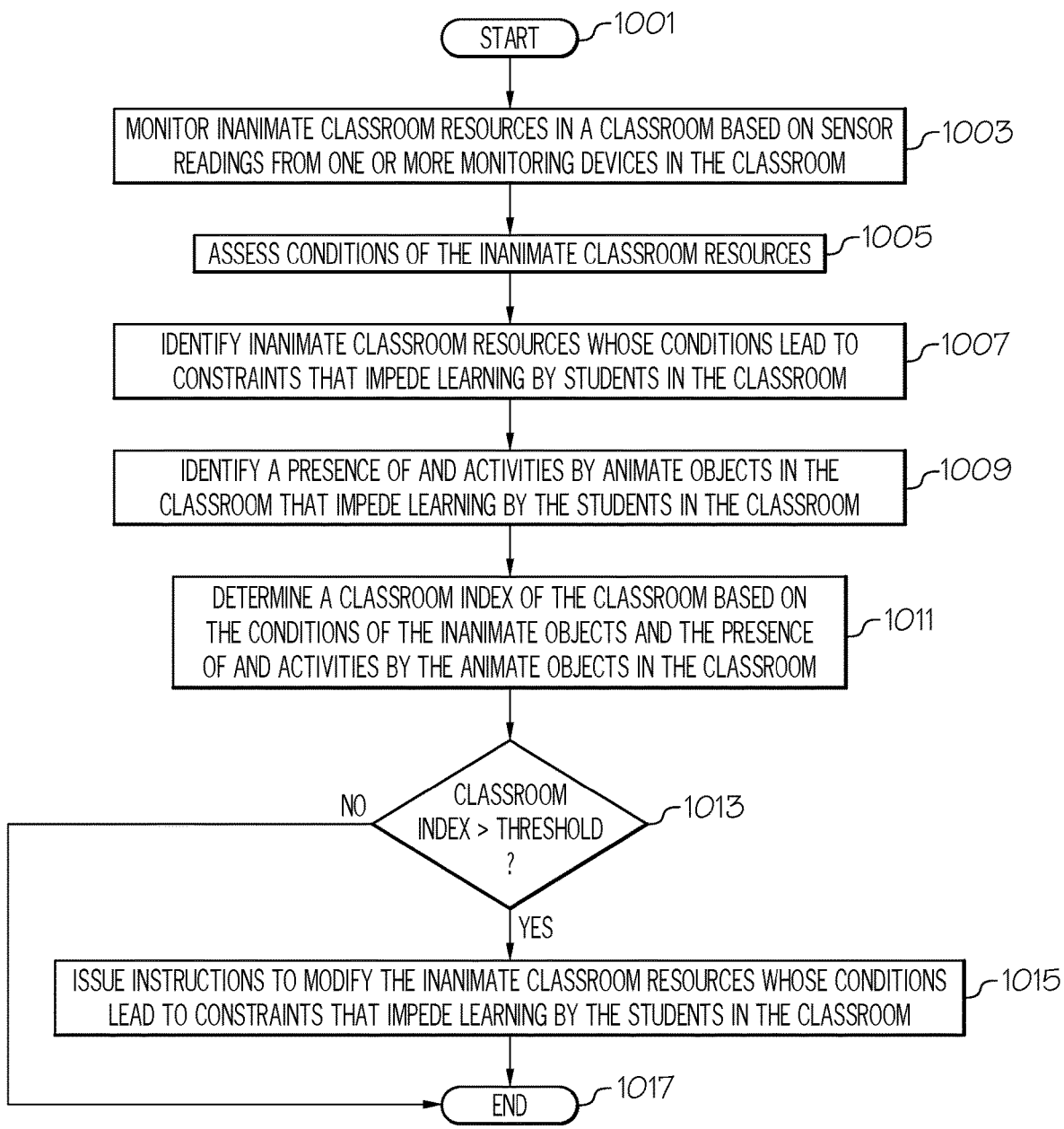
FIG. 10 depicts a first exemplary method in accordance with one or more embodiments of the present invention.

With reference now to FIG. 10, operations performed by one or more processors and/or other hardware devices in a first exemplary method in accordance with one or more embodiments of the present invention is presented.

After initiator block 1001, one or more processors (e.g., within monitoring computer 201 shown in FIG. 2) monitor inanimate classroom resources (e.g., broken window 206, broken desk 214, etc.) in a classroom (e.g., classroom 200) based on sensor readings from one or more monitoring devices (e.g., camera 202 and/or sensor(s) 253) in the classroom, as shown in block 1003.

As described in block 1005, one or more processors assess conditions of the inanimate classroom resources (e.g., Are they broken or in good condition? Where are they positioned? Etc.).

As described in block 1007, one or more processors identify inanimate classroom resources whose conditions lead to physical classroom resource constraints that impede learning by students in the classroom (e.g., the inoperable display 208 shown in FIG. 2 cannot be used to present a video on a topic being presented to student 210, thus impeding that student's ability to learn about that topic).

As described in block 1009, one or more processors identify a presence of and activities by animate objects (e.g., animate object 216 shown in FIG. 2) in the classroom that impede learning by the students in the classroom. For example, the presence of a visitor in the classroom may impede the students' ability to concentrate and not be distracted.

As described in block 1011, one or more processors then determine a classroom index of the classroom (i.e., an index of how conducive the classroom is to the student being able to learn classroom material) based on the conditions of the inanimate objects and the presence of and the activities by the animate objects in the classroom.

As depicted in query block 1013, one or more processors determine whether the classroom index exceeds a predetermined threshold value. If so and as described in block 1015, one or more processors issue instructions to modify the inanimate classroom resources whose conditions lead to constraints that impede learning by the students in the classroom.

For example, the one more processors may generate and issue instructions to replace the physical classroom resources having the physical classroom resource constraints with other physical classroom resources that do not have the physical classroom resource constraints.

In another embodiment/example of the present invention, the physical classroom resource constraints are caused by a physical arrangement of the physical classroom resources, such as chairs being arranged in rows rather than in a circle, which is more conducive to collaborative learning. As such, one or more processors will generate instructions to rearrange the physical classroom resources.

In another embodiment/example of the present invention, the physical classroom resource constraints are caused by a defect in one of the physical classroom resources (e.g., the display 208 shown in FIG. 2 is inoperable). As such, one or more processors generate instructions to repair the defect in the physical classroom resource(s), such as sending an instruction to the display 208 to connect to a certain internet protocol (IP) address, access a certain port, etc. that will cause curriculum information to be displayed on the display 208.

The flow chart shown in FIG. 10 ends at terminator block 1017.

In an embodiment of the present invention, one or more processors train a cognitive system (e.g., cognitive agent 513 shown in FIG. 5) to recognize changes to the physical classroom resources based on prior sensor readings that describe previous conditions of the physical classroom resources in the classroom. For example, cognitive agent 513 will recognize that broken window 206 did not have a broken glass pane 205 yesterday, but has it today. The one or more processors then transmit the recognized changes (e.g., the new presence of the broken glass pane 205) to the physical classroom resources to a device that modifies the physical classroom resources. That is, a robotic device may come to the classroom 200 and repair the broken window 206. Furthermore, if display 208 was working yesterday, but today is blanked out, then monitoring computer 201 may send instructions to logic within display 208 to repair a software issue, connect the display 208 to an IP address on the Internet, etc.

In an embodiment of the present invention, one or more processors determine the physical classroom resource constraints that impede learning by students in the classroom based on an analysis of video feeds from the classroom, audio feeds from the classroom, and student records of students in the classroom. That is, the system determines that the physical classroom resource constraints (of the inanimate objects) are in fact detrimental to the students' ability to learn based on an analysis of video feeds from the classroom (such that defective inanimate objects are visually identified), audio feeds from the classroom (such that defective inanimate objects are aurally identified (e.g., by noise generated by display 208) and classroom issues such as students talking out of turn, etc. are identified), and student records of students in the classroom (which identify the history of students' abilities to learn material).

In an embodiment of the present invention, one or more processors display images of the inanimate classroom resources in the classroom, the animate objects in the classroom, and a description of the instructions to modify the inanimate classroom resources on a graphical user interface (GUI) on a remote computer. One or more processors receive instructions from the remote computer to further adjust the inanimate classroom resources based on the images of the inanimate classroom resources in the classroom, the animate objects in the classroom, and the description of the instructions to modify the inanimate classroom resources. One or more processors then further adjust the inanimate classroom resources based on the instructions from the remote computer. That is, the activities presented herein may be displayed on various resources such as user dashboard 707 or user display device 713 shown in FIG. 7, in order to let an administrator know that resources in the classroom may be modified (e.g., the display 208 may be modified in order to improve the learning environment in the classroom 200).

Figure 11:
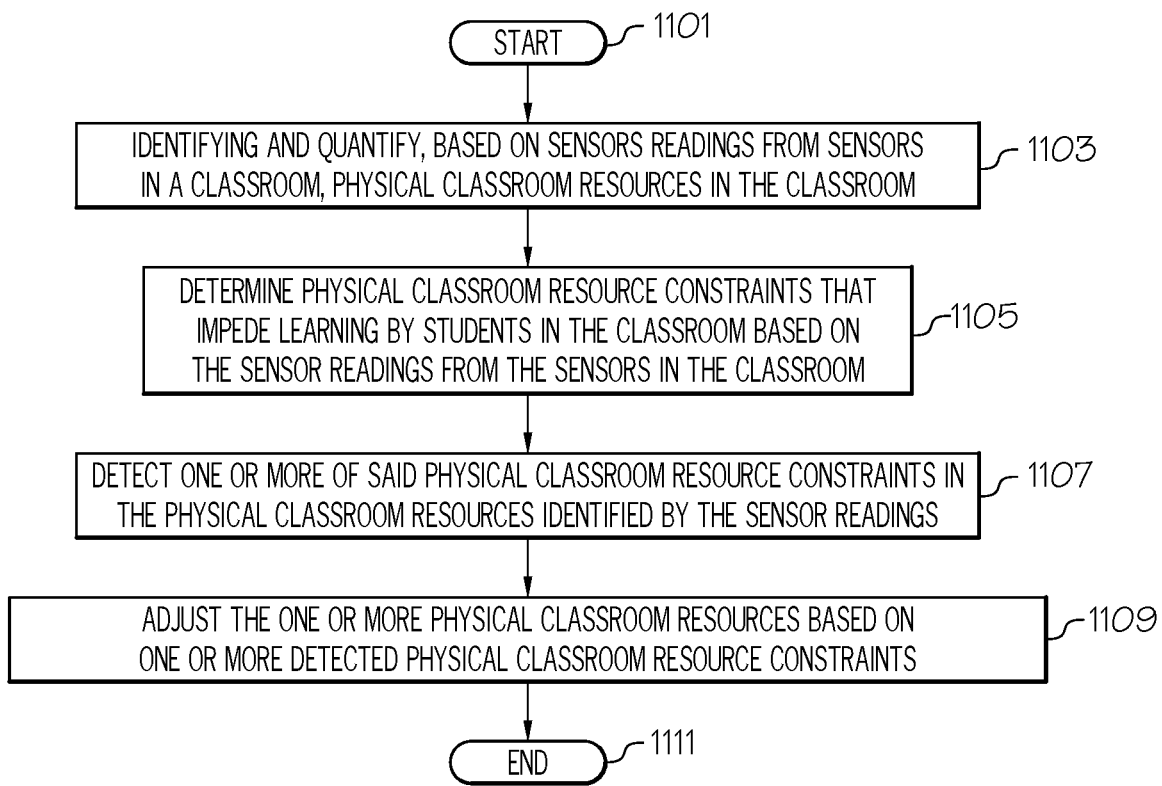
FIG. 11 depicts a second exemplary method in accordance with one or more embodiments of the present invention.

With reference now to FIG. 11, operations performed by one or more processors and/or other hardware devices in a second exemplary method in accordance with one or more embodiments of the present invention is presented.

After initiator block 1101, one or more processors identify and quantify physical classroom resources in the classroom based on sensor readings received from sensors in a classroom, as described in block 1103.

One or more processors then determine physical classroom resource constraints that impede learning by students in the classroom based on the sensor readings from the sensors in the classroom, as described in block 1105.

As described in block 1107, one or more processors detect one or more of said physical classroom resource constraints (e.g., defects that lead to a diminution in students' abilities to learn in a classroom) in the physical classroom resources identified by the sensor readings.

As described in block 1109, one or more processors adjust the one or more physical classroom resources based on one or more detected physical classroom resource constraints.

The flow chart in FIG. 11 ends at terminator block 1111.

As with the invention described in FIG. 10, one embodiment of the invention described in FIG. 11 further comprises training, by one or more processors, a cognitive system to recognize changes to the physical classroom resources based on prior sensor readings that describe previous conditions of the physical classroom resources in the classroom; and transmitting, by one or more processors, recognized changes to the physical classroom resources to a device that modifies the physical classroom resources.

As with the invention described in FIG. 10, one embodiment of the invention described in FIG. 11 further comprises generating, by one or more processors, instructions to replace one or more of the physical classroom resources that have said physical classroom resource constraints with one or more other physical classroom resources that do not have the physical classroom resource constraints.

As with the invention described in FIG. 10, in one embodiment of the invention described in FIG. 11 the physical classroom resource constraints are caused by a physical arrangement of the physical classroom resources, and the invention described in FIG. 11 further comprises generating, by one or more processors, instructions to rearrange one or more of the physical classroom resources in order to remove the physical classroom resource constraints.

As with the invention described in FIG. 10, in one embodiment of the invention described in FIG. 11 the physical classroom resource constraints are caused by a defect in one of the physical classroom resources, and the invention described in FIG. 11 further comprises generating, by one or more processors, instructions to repair the defect in said one of the physical classroom resources.

As with the invention described in FIG. 10, one embodiment of the invention described in FIG. 11 further comprises determining, by one or more processors, the physical classroom resource constraints that impede learning by students in the classroom based on an analysis of video feeds from the classroom, audio feeds from the classroom, and student records of students in the classroom.

Thus, as described herein in one or more embodiments of the present invention, a processor-based analysis takes multimedia inputs (e.g. video stream, image, audio) and context as provided by the device (e.g. camera, mobile, tablet), an electronic timetable, and crowd-source information such as best practices and benchmark. The analyzing may take into consideration history logs (e.g. of student, classroom, resource) and cohorts (e.g. performance report, resource index).

Detecting and analyzing classroom resources includes a focus on object filtering, identification, and matching against benchmark artifacts from other classrooms or schools using visual analytics that points toward poor or good quality classroom environment.

Detecting and analyzing classroom student behavior includes a focus on looking for patterns in attendance, activity, behavior, and interactions from multimedia input pointing toward poor environment and undesired student outcomes.

In accordance with one or more embodiments of the present invention, an object filtering custom software utility accepts a video stream from one or more devices (mainly from low-cost devices) or a previously recorded source through a wireless network and server solution, or peer-to-peer protocol. It uses background subtraction, skin detection and software utilities to differentiate between animate and inanimate objects. The object identification process takes the objects and categorizes them further. Categorizations for animate objects include: human, student, guest, teacher, administrator, researcher, class pet, human arm, human leg, human face, eyes, head, torso, and so on. Categories for inanimate objects includes, but not limited to, chair, desk, table, wall, floor, tablet, phone, pencil, poster, light fixture, chalk board, white board, stapler, laptop and more. Object categorization is enabled by historic model matching and personal recognition and identification. A custom object recognition tool will be employed consisting of a data store of object models and a neural network that has been trained to recognize the objects represented by the models.

In accordance with one or more embodiments of the present invention, animate object models such as student/teacher/administrator will come from a system setup, where the class roll and staff frontal face images with names are loaded into the system. Using this registered information the system will identify people in the classroom when they enter a classroom and face the camera. Upon biometric identification the system will tag the individual and follow their movements throughout a recording period. Coupled with the system recognition of human appendages and gaze detection the system will further categorize animate objects based on body language. For instance, a student sitting calmly and writing in a notebook would be categorized as engaged, but if the teacher is speaking and the majority of student gazes are not aimed at the teacher, the categorization will mention the teacher does not engage the student.

In accordance with one or more embodiments, the present invention includes a mechanism for allowing teacher input to help rectify incorrect system labeling of student affect. In accordance with one or more embodiments of the present invention, the system will learn and label student and teacher affects from tracking movement, body language, interactions and conversations with a teacher. The affect instances include but are not limited to: boredom, confusion, delight, flow and frustration.

In accordance with one or more embodiments of the present invention, a cognitive agent makes inferences based on object analysis, stored records (of student performance, class rolls, subject, test grades, etc.) and observed behaviors. The cognitive agent is trained to understand the affective meanings of body language. The cognitive agent is further trained to understand the interplay of meanings behind human interaction. While the system is being used, classroom video is constantly being recorded and submitted to the cognitive system for recommendations. The cognitive system is thus trained on a plethora of virtually unlimited video of human interaction found on the web. Some of these interactions are labeled, as in the pervasive affect of the scene (e.g., everyone was calmly listening), and the affect of outstanding individuals (e.g., Simon was frustrated and showed it by vigorously shaking his head). After being trained, the cognitive system applies scene understanding to the classroom videos passed to it.

In order for the user to receive only the notifications wanted, one or more embodiments of the present invention utilize a rating system that assigns a level of importance to each notification as well as categorization. For instance, it is unlikely that many teachers desire to receive notifications every minute that inform them the students are paying attention. This type of notification is mostly obvious for teachers at any level of experience. This level of information referred to as logged information (all identifiable events/pervasive affect/individual affect) are logged. However, receiving notifications of all of this information may distract teachers rather than aid them. Therefore, other levels of notification importance and categorization are established. In various embodiments of the present invention, notifications are based on the results of the analysis of animate or inanimate objects, as well as the interplay of both, resulting in notification categories.

Notification categories include but are not limited to: people, environment, individual, group, highly positive, positive, low positivity, highly negative, negative, low negativity, neutral, and status. Through the system described herein, a user/administrator may set types of information and situations of which they want to be notified immediately and/or notified only for purposes of review. Hence, while selecting which situations to be notified of, they will be able to choose from three actions: log, notify immediately, notify end of day. Different stakeholders may need to be informed of different situations. For instance, a teacher may set the system to notify them of negative and highly negative events involving groups of students. A facilities manager may set the system to notify them of negative environmental situations so that they can prioritize acquisitions.

In addition to reporting on situations in the classroom, the present invention allows feedback from the user, by text or voice. Recognizing that the cognitive component is not infallible, the present invention includes a feedback system that allows users to re-label a situation about which they've been notified and/or to recommend alternate corrections to solve issues with inanimate objects in the classroom. Upon being provided with corrective feedback, the cognitive agent/component maintains a note that a situation was labeled incorrectly and utilizes this knowledge when labeling future situations.

Notifications are made by way of the invention's dashboard that is a web based application that includes a smartphone interface.

In some embodiments, the present invention provides a standardized classroom monitoring and management device. For example, if the classroom environment is so poor that it causes student disengagement, the present invention is of great utility for notifying the instructor. The system is thus built to detect and report classroom environments and to identify students using low or high-resolution video.

In additional embodiments, the present invention provides a face identification utility. The utility will be a smart face detector in that it will use contextual information, including the room and time, to get a class roster. Therefore, faces are compared with a very small dataset enabling a lower identification threshold, which in turn aids operation when using low-resolution imaging.

A wireless connection (e.g., a wi-fi connection to the Internet) in the classroom allows a teacher to interact with the device through a wireless network and server solution, or in a peer-to-peer solution. Other custom software utilities allow the administrator or teacher to easily utilize a virtual teacher aid to the classroom, which pays attention to student behavior while the teacher's focus is elsewhere.

In one or more embodiments, the present invention provides a system and method for producing a cognitive dash board for the users of a learning environment consisting of one or more sensing elements sensing the objects and events in the learning environment, log information of the expected activities, identities, and entities in the learning environment, a processing element capable of processing the sensory and log information available, and/or one or more compute engines to compute sensory analytics to compute attendance, activity, behavior and interaction; one or more compute engines to compute sensory analytics to compute condition of the individual elements (e.g., chair, desk, wall-paint) of the learning environment infrastructure; a compute engine for aggregating the condition of the individual elements into an aggregated classroom condition for effective learning based on continuous multimedia information captured by low-cost devices, classroom dynamic activities, and other contextual information; a display engine with the ability to show on the screen trends in attendance, activity, behavior, and interactions that point toward less desired student outcomes; an interaction engine with the ability to interact with the user about analysis results whose ability to effect change is most probable; and/or a virtual teacher aid to the classroom that can pay attention to student behavior while the teacher's focus is elsewhere.

In an embodiment of the present invention, detecting the need for managing classroom artifacts involves a monitoring of classroom resources, facial recognition, student attendance detection, etc.

In an embodiment of the present invention, analyzing a need is determined and shaped by an analysis of a past history of resources, an individual student or cohort.

In an embodiment of the present invention, benchmark matching involves visual analytics of low quality video and images, the use of ranking utility against resources from other classrooms of the same school or other schools, the monitoring of resource quality and communication, etc.

One or more embodiments of the present invention may be implemented in a cloud computing environment. Nonetheless, it is to be understood that although this disclosure includes a detailed description of cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 12:
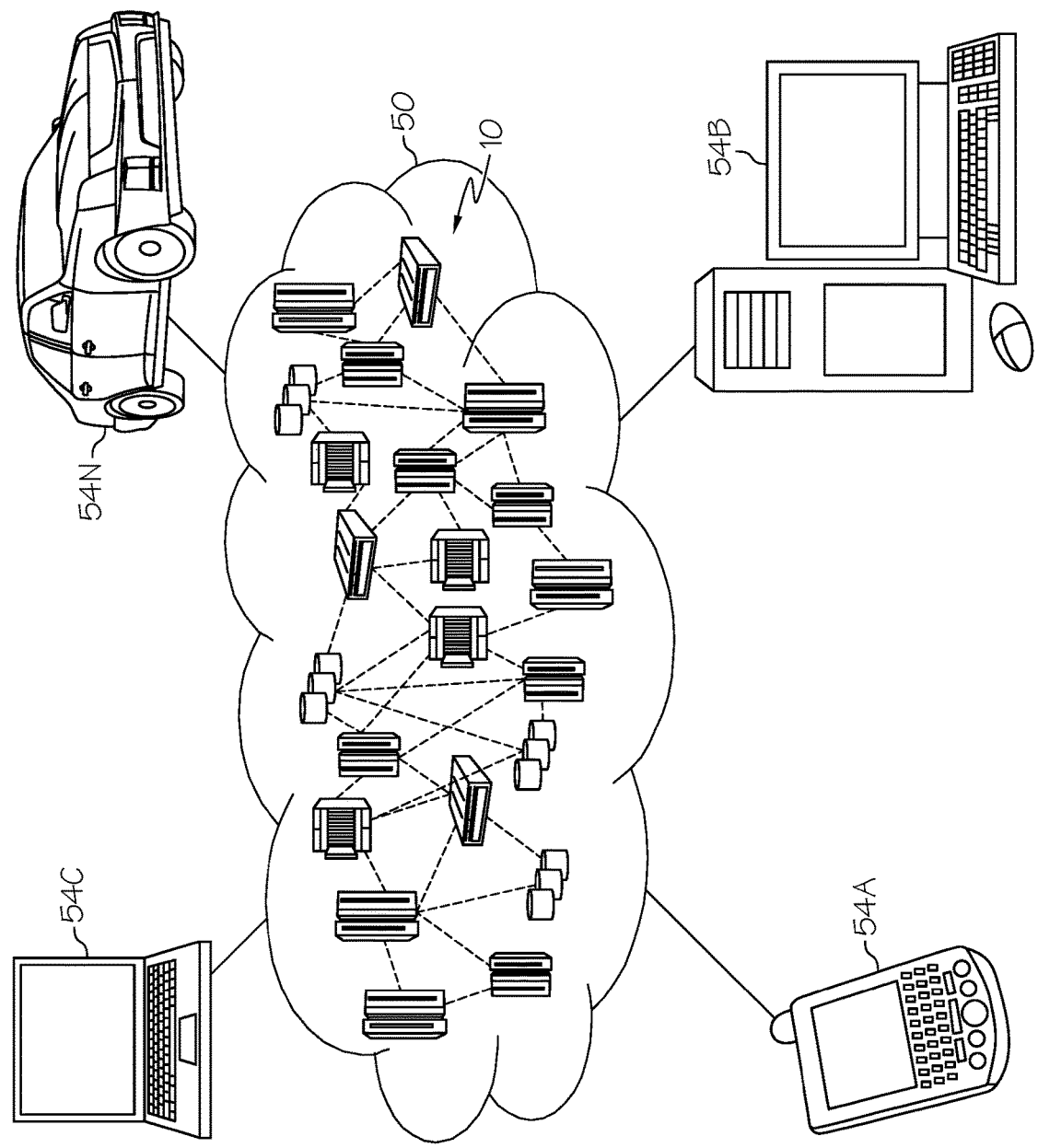
FIG. 12 depicts a cloud computing environment according to an embodiment of the present invention.

Referring now to FIG. 12, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 12 are intended to be illustrative only and that computing nodes 10 and cloud computing environment 50 can communicate with any type of computerized device over any type of network and/or network addressable connection (e.g., using a web browser).

Figure 13:
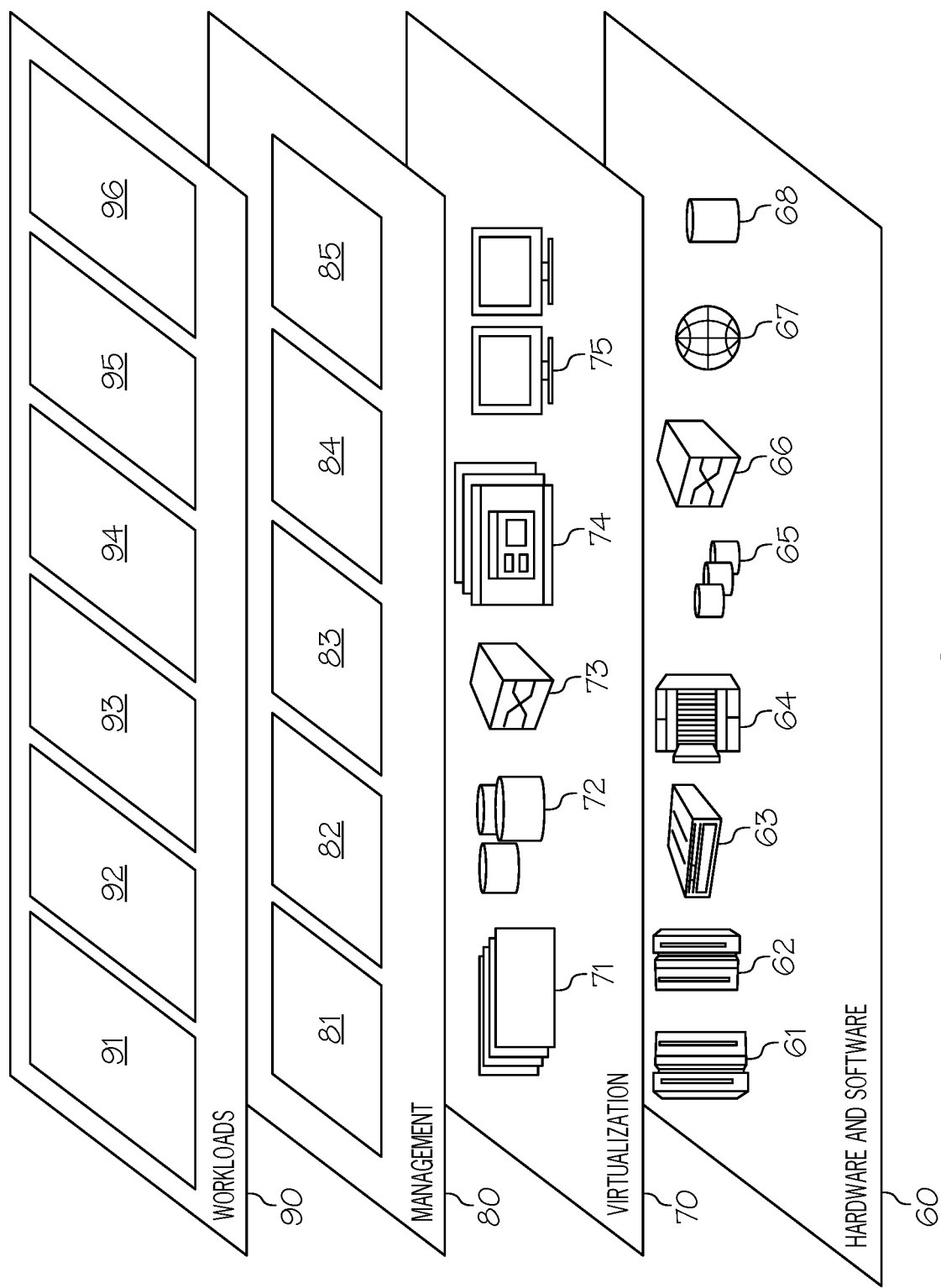
FIG. 13 depicts abstraction model layers of a cloud computing environment according to an embodiment of the present invention.

Referring now to FIG. 13, a set of functional abstraction layers provided by cloud computing environment 50 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and classroom resource configuration and improvement processing 96, which can perform one or more features of the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Methods described in the present invention may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. By way of further example (only), one or more computer-implemented (e.g., in software) methods described herein may be emulated by a hardware-based VHDL program, which can then be applied to a VHDL chip, such as a FPGA.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having thus described embodiments of the present invention of the present application in detail and by reference to illustrative embodiments thereof, it will be apparent that modifications and variations are possible without departing from the scope of the present invention defined in the appended claims.

What is claimed is:
1. A method comprising:
identifying and quantifying, by one or more processors, physical classroom resources in a classroom based on sensor readings received from sensors in the classroom, wherein the physical classroom resources are inanimate physical objects that are components of the classroom;
determining, by the one or more processors, physical classroom resource constraints that impede learning by students in the classroom based on the sensor readings from the sensors in the classroom, wherein the physical classroom resource constraints are caused by physical defects, in one or more of the physical classroom resources, that lead to a diminution in students' abilities to learn in the classroom, wherein the diminution in students' abilities to learn in the classroom is based on a focus determination and a group affect determination, wherein the focus determination is a determination of how broken objects in the classroom adversely affect a learning focus of a single student, and wherein the group affect determination is a determination of how the broken objects adversely affect learning focuses of all students in the classroom;
identifying, by the one or more processors, the diminution in the students' abilities to learn in the classroom based on a decrease in the learning focus of the single student and a decrease in the learning focuses of all of the students in the classroom, wherein the diminution in the students' abilities to learn in the classroom is caused by the physical detects in the one or more of the physical classroom resources in the classroom;
training, by the one or more processors, a neural network to recognize changes to the physical classroom resources based on prior sensor readings that describe previous conditions of the physical classroom resources in the classroom;
generating, by the one or more processors, a set of instructions based on the recognized changes to the physical classroom resources;
transmitting, by the one or more processors, the set of instructions to a robotic device for implementing specified logical functions regarding the cognized changes to the physical classroom resources;
repairing, by the robotic device, the physical defects in the one or more of the physical classroom resources based on the specified logical functions;
receiving, by the one or more processors, new sensor readings that describe new changes to the physical classroom resources; and retraining, by the one or more processors, the neural network with the new sensor readings to further recognize changes to the physical classroom resources.

2. The method of claim 1, further comprising:
replacing one or more of the physical classroom resources that have said physical classroom resource constraints with one or more other physical classroom resources that do not have the physical classroom resource constraints.

3. The method of claim 1, wherein the physical classroom resource constraints are further caused by a physical arrangement of the physical classroom resources, and wherein the method further comprises:
rearranging one or more of the physical classroom resources in order to further remove the physical classroom resource constraints.

4. The method of claim 1, further comprising:
determining, by the one or more processors, the physical classroom resource constraints that impede learning by the students in the classroom based on an analysis of video feeds from the classroom, audio feeds from the classroom, and student records of students in the classroom.

5. A computer system comprising:
one or more processors,
one or more computer readable memories, and
one or more computer readable non-transitory storage mediums, and program instructions stored on at least one of the one or more computer readable non-transitory storage mediums for execution by at least one of the one or more processors via at least one of the one or more computer readable memories, the stored program instructions executed to perform a method comprising:
identifying and quantifying physical classroom resources in a classroom based on sensor readings received from sensors in the classroom, wherein the physical classroom resources are inanimate physical objects that are components of the classroom;
determining physical classroom resource constraints that impede learning by students in the classroom based on the sensor readings from the sensors in the classroom, wherein the physical classroom resource constraints are caused by physical defects, in one or more of the physical classroom resources, that lead to a diminution in students' abilities to learn in the classroom, wherein the diminution in students' abilities to learn in the classroom is based on a focus determination and a group affect determination, wherein the focus determination is a determination of how broken objects in the classroom adversely affect a learning focus of a single student, and wherein the group affect determination is a determination of how the broken objects adversely affect learning focuses of all students in the classroom;
identifying the diminution in the students' abilities to learn in the classroom based on a decrease in the learning focus of the single student and a decrease in the learning focuses of all of the students in the classroom, wherein the diminution in the students' abilities to learn in the classroom is caused by the physical defects in the one or more of the physical classroom resources in the classroom;
training a neural network to recognize changes to the physical classroom resources based on prior sensor readings that describe previous conditions of the physical classroom resources in the classroom;
generating a set of instructions based on the recognized changes to the physical classroom resources;
transmitting the set of instructions to a robotic device for implementing specified logical functions regarding the cognized changes to the physical classroom resources;
repairing, by the robotic device, the physical defects in the one or more of the physical classroom resources based on the specified logical functions;
receiving new sensor readings that describe new changes to the physical classroom resources; and
retraining the neural network with the new sensor readings to further recognize changes to the physical classroom resources.

6. A computer program product for optimizing classroom physical resources, the computer program product comprising a non-transitory computer readable storage device having program instructions embodied therewith, the program instructions readable and executable by a computer to perform a method comprising:
identifying and quantifying physical classroom resources in a classroom based on sensor readings received from sensors in the classroom, wherein the physical classroom resources are inanimate physical objects that are components of the classroom;
determining physical classroom resource constraints that impede learning by students in the classroom based on the sensor readings from the sensors in the classroom, wherein the physical classroom resource constraints are caused by physical defects, in one or more of the physical classroom resources, that lead to a diminution in students' abilities to learn in the classroom, wherein the diminution in students' abilities to learn in the classroom is based on a focus determination and a group affect determination, wherein the focus determination is a determination of how broken objects in the classroom adversely affect a learning focus of a single student, and wherein the group affect determination is a determination of how the broken objects adversely affect learning focuses of all students in the classroom;
identifying the diminution in the students' abilities to learn in the classroom based on a decrease in the learning focus of the single student and a decrease in the learning focuses of all of the students in the classroom, wherein the diminution in the students' abilities to learn in the classroom is caused by the physical defects in the one or more of the physical classroom resources in the classroom;
training a neural network to recognize changes to the physical classroom resources based on prior sensor readings that describe previous conditions of the physical classroom resources in the classroom;
generating a set of instructions based on the recognized changes to the physical classroom resources;
transmitting the set of instructions to a robotic device for implementing specified logical functions regarding the cognized changes to the physical classroom resources;
repairing, by the robotic device, the physical defects in the one or more of the physical classroom resources based on the specified logical functions;
receiving new sensor readings that describe new changes to the physical classroom resources; and
retraining the neural network with the new sensor readings to further recognize changes to the physical classroom resources.

* * * * *